United States Patent
Shintani et al.

Patent Number: 6,036,930
Date of Patent: Mar. 14, 2000

[54] PROCESS FOR PRODUCING ALUMINUM OXIDE FIBERS

[75] Inventors: Yoshitomo Shintani; Yukio Okochi, both of Susono, Japan

[73] Assignee: Toyota Jidosha Kabushiki Kaisha, Toyota, Japan

[21] Appl. No.: 09/154,771

[22] Filed: Sep. 17, 1998

[30] Foreign Application Priority Data

Oct. 31, 1997 [JP] Japan ................. 9-314627

[51] Int. Cl.[7] ............... C01F 1/00; C01F 7/02; C01B 35/04; C01B 35/02; C03C 13/00

[52] U.S. Cl. ............... 423/111; 423/297; 423/598; 423/600; 423/625; 501/35; 501/95; 501/96; 501/98

[58] Field of Search ............... 423/111, 592, 423/593, 600, 624, 625, 297, 298; 501/35, 49, 52, 95, 96, 153

[56] References Cited

U.S. PATENT DOCUMENTS

| | | | |
|---|---|---|---|
| 4,101,615 | 7/1978 | Horikiri et al. | 264/63 |
| 4,540,475 | 9/1985 | DeAngelis | 204/67 |
| 4,698,319 | 10/1987 | Ray | 501/87 |
| 4,774,210 | 9/1988 | Ray | 501/127 |
| 4,804,642 | 2/1989 | Ray | 501/87 |
| 4,804,646 | 2/1989 | Ray | 501/105 |
| 4,961,990 | 10/1990 | Yamada et al. | 428/240 |
| 5,053,364 | 10/1991 | Ray | 501/95 |
| 5,108,964 | 4/1992 | Corbett et al. | 501/89 |

FOREIGN PATENT DOCUMENTS

| | | |
|---|---|---|
| 7-330499 | 12/1995 | Japan . |
| 7-330500 | 12/1995 | Japan . |

*Primary Examiner*—Gary P. Straub
*Assistant Examiner*—Cam N. Nguyen
*Attorney, Agent, or Firm*—Oliff & Berridge, PLC

[57] ABSTRACT

The present invention provides a process for producing aluminum oxide fibers and, particularly, a process for producing aluminum fibers that have a high aspect ratio and can be accurately aligned, said process for producing aluminum oxide fibers comprising the steps of: uniformly mixing an aluminum or aluminum alloy powder with a boron oxide powder or a powder which, upon heating, can be converted to a boron oxide powder; and heating the mixed powder, or comprising the steps of: mixing not more than 50% by weight, in terms of titanium, of a titanium or titanium alloy powder to the starting mixture; and heating the mixed powder.

7 Claims, 1 Drawing Sheet

PROCESS FOR PRODUCING ALUMINUM OXIDE FIBERS

BACKGROUND OF THE INVENTION

1. Field of the Invention

The present invention relates to a process for producing aluminum oxide fibers, and more particularly to a process for producing aluminum oxide fibers that have a high aspect ratio and can be accurately aligned.

2. Description of the Prior Art

Ceramic fiber composite materials have been extensively utilized because they have, regarding mechanical properties, strength comparable to high-strength metallic materials and, as members, are lightweight and inexpensive. The development of these ceramic fiber composite materials has been mainly directed to an increase in heat resistance/strength and an increase in elasticity, or a mass production technique that can bring physical properties, including these properties, close to the theoretical values and can control the physical properties as desired.

Among others, aluminum oxide whiskers, as compared with the other materials, have particularly higher strength and higher elasticity and better stability by virtue of higher melting point. In the production process thereof, the relationship between the crystal growth direction and the strength level has been established. On the other hand, for continuous fibers of α-type alumina, the strength level is lower than that of whiskers, but it is still considerably higher than that for other continuous long fibers.

Conventional aluminum oxide whiskers have been produced mainly by a gaseous phase process. A reaction involved in this process is such that $Al_2O_3$ is reduced with $H_2$ at a high temperature of 2000° C. to evolve an $Al_2O$ gas which is then grown into whiskers at 1600 to 1700° C. Other reaction methods reported in the art include a reaction of molten aluminum with a hydrogen stream containing $H_2O$ at 1300 to 1450° C., a reaction of an $AlCl_3$ gas with an $H_2O$ gas at 1500° C. or above, and a reaction of an $AlF_3$ gas with an $H_2O$ gas at 1400° C.

On the other hand, no significant variation in strength and a high aspect ratio are required of fibers as a material for fiber composite materials (MMC (metal-base metal composite materials) and FRP (fiber-reinforced plastics). The conventional fibers, however, cannot satisfy these requirements. Accordingly, the development of the above-described aluminum oxide fibers improved in the above properties have been desired in the art.

SUMMARY OF THE INVENTION

An object of the present invention is to provide an aluminum oxide fibers having an improved aspect ratio as an abrasion-resistant member and to provide a process for producing the aluminum oxide fibers that can relatively simply produce the aluminum oxide fibers by low-temperature treatment.

Another object of the present invention is to provide a process for producing aluminum oxide fibers, utilizing a rapid exothermic reaction caused by addition of a titanium powder in the above production process, that can accelerate the decomposition of boric acid and the synthesis of aluminum oxide and can rapidly produce the aluminum oxide fibers.

Another object of the present invention is to provide a process for producing aluminum oxide fibers that can produce aluminum oxide fibers which, when applied to MMC, FRP or the like, can be accurately aligned and becomes anisotropic to improve mechanical properties.

The gist of the present invention will be described as follows.

(1) A process for producing aluminum oxide fibers, characterized by comprising, in synthesizing aluminum oxide fibers, the steps of: uniformly mixing an aluminum or aluminum alloy powder with a boron oxide powder or a powder which upon heating can be converted to a boron oxide powder; and heating the mixed powder.

(2) A process for producing aluminum oxide fibers, characterized by comprising, in synthesizing aluminum oxide fibers, the steps of: uniformly mixing an aluminum or aluminum alloy powder with a boron oxide powder, or a powder which, upon heating, can be converted to a boron oxide powder, and not more than 50% by weight, in terms of titanium, of a titanium or titanium alloy powder; and heating the mixed powder.

(3) The process for producing aluminum oxide fibers according to item (1) or (2), wherein the molar ratio of aluminum and boron components to be mixed each other is from 9:0.5 to 1:1.

(4) The process for producing aluminum oxide fibers according to item (1) or (2), wherein heating temperature is 800 to 1300° C. and the heating time is 1 to 10 hours as heating conditions for the mixed powder.

(5) The process for producing aluminum oxide fibers according to item (1) or (2), wherein the diameter of the agglomerated particles in the mixed powder is 5 to 1000 μm.

(6) The process for producing aluminum oxide fibers according to item (1) or (2), wherein the aspect ratio of the aluminum oxide fibers, after synthesis, of is 100 to 30,000.

DETAILED DESCRIPTION OF THE PREFERRED EMBODIMENT

Figure 1:
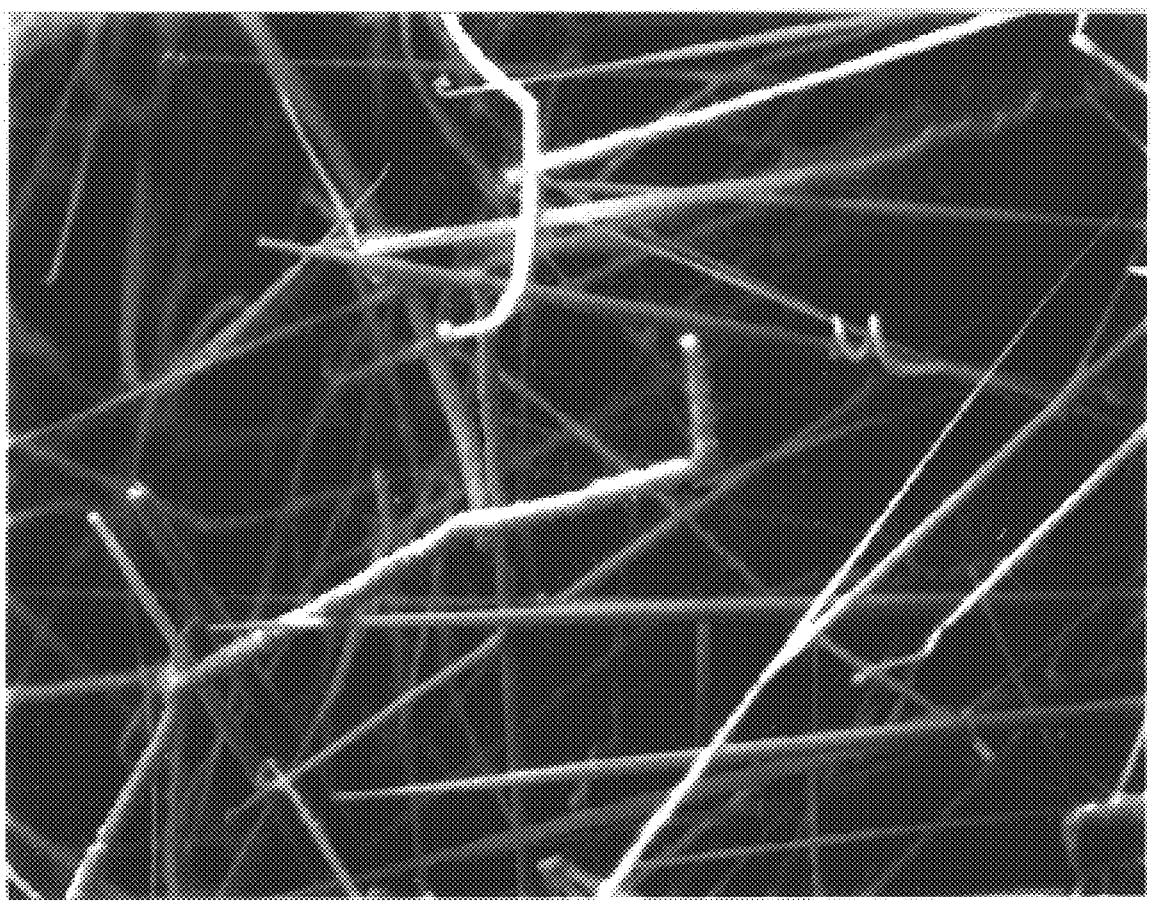
FIG. 1 is a scanning electron photomicrograph of a structure of aluminum oxide fibers according to one embodiment of the present invention.

According to the process of the present invention, fibers which, unlike the conventional fibers, have a high aspect ratio (length/diameter), can be easily produced. Further, according to the process of the present invention, such fibers can be synthesized even at a lower temperature (800° C.) than that used in the conventional process and moreover can be synthesized in an inert atmosphere as well as in air. The aluminum oxide fibers according to the present invention can be highly aligned by virtue of a high aspect ratio and hence are useful for reinforcement in anisotropic MMC, FRP and other materials.

The aspect ratio is a principle factor in a short fiber (reinforcing material). When the aspect ratio is too small, a sufficient reinforcing strength cannot be obtained since stress acting on a fiber is propagated through shear stress on a boundary between the fiber and the material.

According to the present invention, molding is carried out by a complete dry pressing process rather than a wet pressing process wherein the mixing of starting material powders and molding are carried out in a melted state. Further, in the step of heating, the molding is heated to a temperature at which the aluminum oxide fibers are synthesized, and self-generation of heat is allowed to take place in titanium or a titanium alloy added to the starting mixture, thus permitting aluminum oxide fibers having a high length to be directly produced. As opposed to the conventional production process of aluminum oxide fibers involving a problem associated with the homogeneity of acicular fibers, the process of the present invention enables the production of aluminum oxide fibers, free from the problem of the prior art technique, in a high yield in such a simple manner that requires only the step of heating the molding in the air to an aluminum oxide fiber synthesis temperature.

The present invention has the following features.

According to the first feature of the present invention, an aluminum powder as a starting material is uniformly mixed with boron oxide and titanium, and the mixed powder is molded by a dry pressing process. In this case, aluminum or an aluminum alloy may be used as an aluminum source. Regarding a boron source, either boron oxide or a boron compound which, upon heating, can be converted to boron oxide, for example, $H_3BO_3$, $H_2B_4O_7$ or $HBO_2$, may be used. The proportion of the aluminum powder and boron oxide added is preferably such that the molar ratio of aluminum to boron is 9:0.5 to 1:1.

According to the second feature of the present invention, the above molding is heated in air or in an argon atmosphere. In the present invention, as described below, the production of the aluminum oxide fibers is greatly influenced by the amount of titanium added. Therefore, it is considered that a rapid exothermic reaction of the titanium powder with the aluminum powder causes decomposition of the boron source, accelerating the growth energy of aluminum oxide fibers, which results in the production of along aluminum oxide fiber. Molding of the aluminum oxide fibers prepared in this way may be carried out by any of a method wherein the material is continuously fed and a method wherein a necessary amount of the material is sealed in a container and mass transfer is performed by utilizing a temperature gradient. These methods do not adversely effect the present invention.

For the aluminum oxide fibers according to the present invention, basically, the chemical and physical properties can be simultaneously controlled by a solid phase reaction. Therefore, a fiber can be provided which is free from significant defects and possesses high strength and high abrasion resistance approximately equal to the theoretically attainable values.

Regarding the heating temperature, heating at a temperature of 1200° C. or above, at which the solid phase reaction can be accelerated, is important from the viewpoint of accelerating the solid phase decomposition and diffusion between elements in the synthesis. The aluminum oxide fibers according to the present invention can be utilized as MMC (metal-base metal composite materials) and FRP (fiber-reinforced plastics) of various materials in order to reinforce the materials and to improve functionality.

Not more than 50% by weight, in terms of titanium, of a titanium or titanium alloy powder is added and mixed with the starting mixture to prepare agglomerated particles of the mixture which are then formed at room temperature by dry pressing followed to heating to prepare along aluminum oxide fiber. Regarding the amount of titanium added, although the aluminum oxide fibers can be grown in a system not containing titanium (Ti: 0%), a system containing titanium is likely to enhance the growth rate.

In this case, the diameter of each particle constituted by the mixture is preferably 5 to 1000 μm.

FIG. 1 shows a scanning electron photomicrograph of a product prepared, in a working example described below, by mixing an optimal amount of a titanium powder with a starting mixture, dry-molding the mixture, and baking the resultant compact. From FIG. 1, it is apparent that the aluminum oxide fibers have an even size and, in addition, are aligned. Further, the aluminum oxide fibers had a diameter of 0.1 to 5 μm and a length of 10 to 3000 μm.

The present invention will be described in more detail with reference to the following examples.

EXAMPLES

Example 1

In this example of the present invention, 10 g of an aluminum powder, 4 g of boric acid ($H_3BO_3$) (aluminum to boron molar ratio 9:1.5), and 5 g of titanium (Ti) were mixed together, and the mixed powder was formed in a mold (diameter: 30) at a plane pressure of 60 ton/cm$^2$.

Thereafter, the resultant compact was heated in the air at 1200° C. for 3 hr.

The aluminum oxide fibers thus prepared had a size of 0.5 to 3 μm in diameter and 50 to 500 μm in length.

Example 2

In this example, 10 g of an aluminum powder, 4 g of boric acid ($H_3BO_3$) (aluminum to boron molar ratio 9:1.5), and 1 g of titanium (Ti) were mixed together, and the mixed powder was formed in a mold (diameter: 30) at a plane pressure of 80 ton/cm$^2$.

Thereafter, the resultant compact was heated in an argon atmosphere at 1200° C. for 3 hr.

The aluminum oxide fibers thus prepared had a size of 0.5 to 3 μm in diameter and 50 to 300 μm in length.

Example 3

In this example, 10 g of an aluminum (5 wt %)—magnesium alloy powder, 3 g of boron oxide ($B_2O_3$) (aluminum to boron molar ratio 9:2.2), and 5 g of titanium (Ti) were mixed together, and the mixed powder was formed in a mold (diameter: 30) at a plane pressure of 60 ton/cm$^2$.

Thereafter, the resultant compact was heated in the air at 1200° C. for 2 hr.

The aluminum oxide fibers thus prepared had a size of 0.5 to 3 μm in diameter and 50 to 500 μm in length.

According to the present invention, aluminum oxide fibers can be easily produced, and fibers having a high aspect ratio can be produced as a compact of high volume fraction without breakage of the fibers. The compact, when applied to MMC and FRP, can provide members having high strength and improved abrasion resistance. The production process according to the present invention can produce the aluminum oxide fibers in a relatively simple manner with high efficiency.

We claim:

1. A process for producing aluminum oxide fibers characterized by comprising, in synthesizing aluminum oxide fibers, the steps of: uniformly mixing an aluminum or aluminum alloy powder with a boron oxide powder or a powder which, upon heating, can be converted to a boron oxide powder, and not more than 50% by weight, in terms of titanium, of a titanium or titanium alloy powder; and heating the mixed powder.

2. The process for producing aluminum oxide fibers according to claim 1, wherein the molar ratio of aluminum and boron components to be mixed each other is from 9:0.5 to 1:1.

3. The process for producing aluminum oxide fibers according to claim 1, wherein the heating temperature is 800 to 1300° C. and the heating time is 1 to 10 hours as heating conditions for the mixed powder.

4. The process for producing aluminum oxide fibers according to claim 3, wherein the heating is conducted in air.

5. The process for producing aluminum oxide fibers according to claim 1, wherein the diameter of the agglomerated particles in the mixed powder is 5 to 1000 $\mu$m.

6. The process for producing aluminum oxide fibers according to claim 1, wherein the aspect ratio of the aluminum oxide fibers after synthesis is 100 to 30,000.

7. The process for producing aluminum oxide fibers according to claim 1, wherein 0% by weight of titanium oxide is present.

* * * * *